United States Patent [19]

Tauer

[11] E Re. 29,175

[45] Reissued Apr. 12, 1977

[54] COMPACT LIFT FOR VAN

[76] Inventor: Kenneth A. Tauer, 9801 Robin Oak Rd., Minnetonka, Minn. 55343

[22] Filed: June 21, 1976

[21] Appl. No.: 698,296

Related U.S. Patent Documents

Reissue of:

[64] Patent No.: 3,826,386
Issued: July 30, 1974
Appl. No.: 346,349
Filed: Mar. 30, 1973

U.S. Applications:

[63] Continuation-in-part of Ser. No. 322,732, Jan. 11, 1973, abandoned.

[52] U.S. Cl. ..... 214/77 R

[51] Int. Cl.[2] ..... B60G 1/48

[58] Field of Search ..... 214/77, 75 T, 75 R, 214/83.24, 80, 450, 130, DIG. 10

[56] References Cited

UNITED STATES PATENTS

| | | | |
|---|---|---|---|
| 2,426,114 | 8/1947 | Novotney | 214/75 T |
| 3,233,758 | 2/1966 | Darfus | 214/77 P |
| 3,258,139 | 6/1966 | Ridgeway | 214/77 P |
| 3,651,965 | 3/1972 | Simonelli et al. | 214/75 R |
| 3,710,962 | 1/1973 | Fowler | 214/75 R |

*Primary Examiner*—Robert J. Spar
*Assistant Examiner*—Lawrence J. Oresky
*Attorney, Agent, or Firm*—James A. Eyster

[57] ABSTRACT

An electrically-operated lift platform is provided for insulation at the side or rear door of a van-type passenger/cargo automobile body. The platform is long enough to accommodate a wheel chair. The platform sides are connected to two linkage mechanisms, secured to the body inside the van at the top and sides of the door opening. The lift, in operation, moves between a position flat on the ground outside the door to a position level with the van floor, keeping horizontal during travel between these positions. The lift also can be moved from the floor position to a storage position in which the lift platform is vertical and entirely within the van, so that the van doors can be closed, when the lift is entirely concealed from outside view.

In a first embodiment the lift is operated electrically, and in a second, hydraulically.

5 Claims, 16 Drawing Figures

FIG. 1
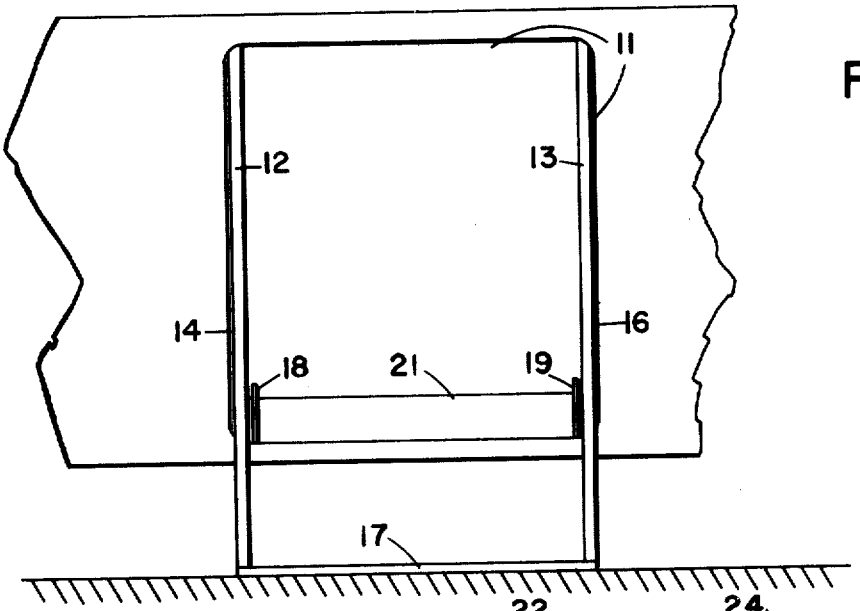
FIG. 3
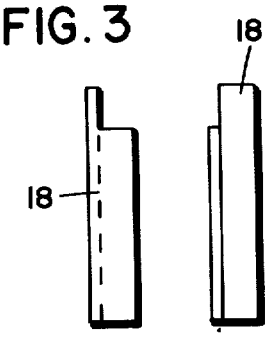
FIG. 2
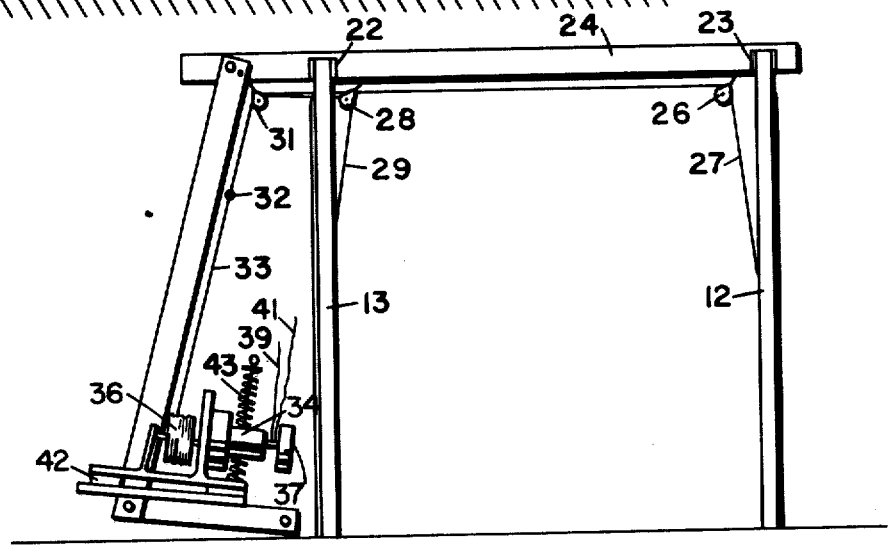
FIG. 4
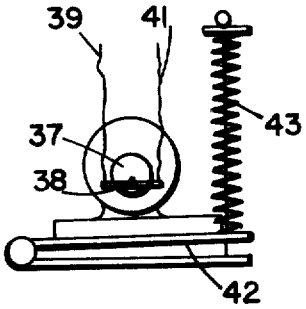
FIG. 5

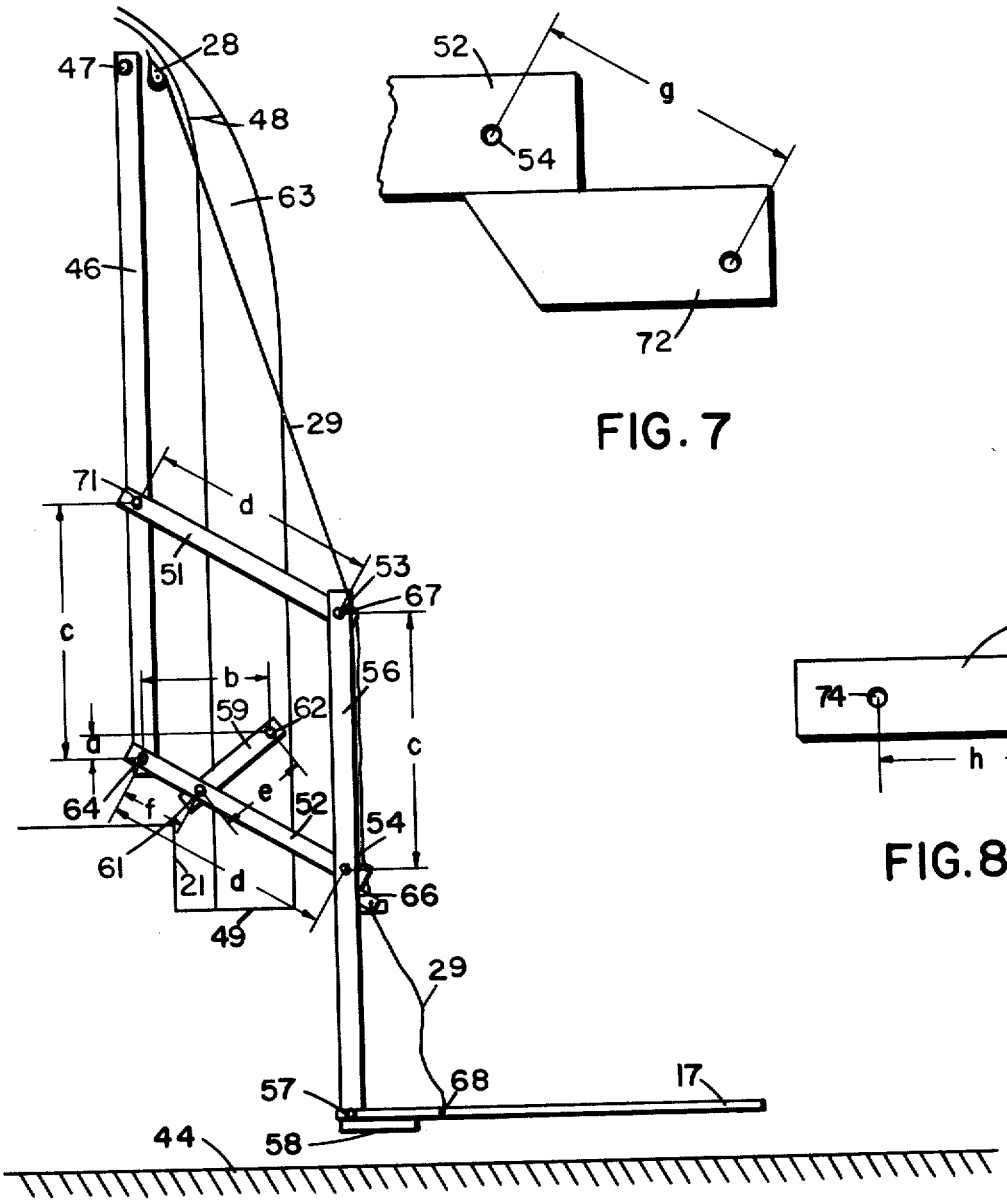
FIG. 6
FIG. 7
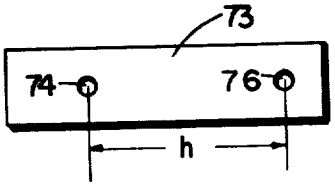
FIG. 8

COMPACT LIFT FOR VAN

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of the copending application, now abandoned, by the same applicant, Ser. No. 322,732, filed Jan. 11, 1973, for a compact and concealable lift for van.

BACKGROUND OF THE INVENTION

This invention relates to lifts installed in automobiles and particularly to lifts designed for installation at the side or rear doors of automobile van bodies, and intended primarily to lift wheel chairs.

Lifting tailgates are commonly used in truck bodies to lift heavy loads from the level of the ground to that of the truck bed. These lifts are not directly adaptable, however, to the purposes of this invention.

SUMMARY OF THE INVENTION

One object of this invention is to provide means for a person, confined to a wheel chair, to enter and leave the body of an automobile van by his own, unaided effort.

Another object is to provide a power-operated lift for installation in the door opening of an automobile van body, the lift being entirely concealed within the van when not in use and with the door closed.

Another object is to provide a lift for lifting, vertically, a weight from ground level to floor level of an automobile, the lift including its platform being entirely concealed within the automobile body when not in use.

This invention provides a platform, large enough to carry a wheel chair, secured to two linkages. The linkages are installed inside the side or rear door opening of a van-type automobile body. The points of fastening of the linkages to the body structure are entirely within the van and do not involve cutting or securing to the outer body surface. When the doors are closed the lift structure is entirely concealed.

The lift is operated by a small, 12-volt direct-current gear motor, connected to the automobile battery.

The lift platform, in its lowest position, rests on the ground outside the van door, so that a wheel chair can be wheeled onto the platform and positioned parallel to the van body wall. A cord attached to a switch is then pulled by the wheel chair occupant, starting the lift motor. When the lift platform reaches the van floor level the cord is released, the lift motor stops, and the wheel chair occupant wheels himself onto the van floor. He then again pulls the cord and the lift platform rotates to a vertical position, while the lifting linkages, one at each side of the door opening, nest themselves within the van. The wheel chair occupant then releases the cord and, both the platform and linkage mechanisms being entirely inside the van, he can close the van door.

When the wheel chair occupant desires to leave the van, he wheels himself along the van floor to the doorway and reverses the described operation.

BRIEF DESCRIPTION OF THE DRAWING

FIG. 1 is an outside view of the open side door of an automobile van in which the lift is installed.

FIG. 2 is a view of one of the stops secured to the van step riser in the first embodiment.

FIG. 3 is a side view of the stop.

FIG. 4 is a view of the first embodiment from the inside of the van of the right side door opening.

FIG. 5 is an end view of the motor, switch and spring shock absorber of the first embodiment.

FIG. 6 is an elevation view looking forward, from within the right side door opening, of the first embodiment linkage with the platform down.

FIG. 7 depicts, in the first embodiment, an extension secured to the lower pivot arm.

FIG. 8 depicts the swing arm in the first embodiment.

DESCRIPTION OF THE PREFERRED EMBODIMENT

Figure 9:
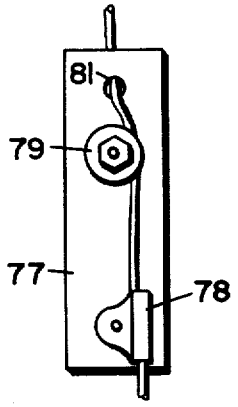
FIG. 9 depicts the cable-clamping piece in the first embodiment.

Referring to FIG. 1, a van having a side door is shown. The door opening, viewed from outside the van, as a clear opening, 11, in a selected van, 47 inches high and 49½ inches wide. The installed lift is shown with its platform in its lowest position, resting near the ground outside the van. The visible parts of the lift include two linkages, 12 and 13, each being secured to the inside side wall of the van above the door. Each linkage also has a second point of connection to the body of the van, one of the links of each linkage being pivotally secured to the door jamb, indicated at points 14 and 16. The edge of the lift platform is shown at 17, resting on the ground outside the van.

The first embodiment, depicted in FIGS. 1 to 12, is described as follows.

Two stops, 18 and 19, are fastened to the riser 21 of the van step. Each stop is made of angle iron, with one side cut away at the top for a short distance, as is more clearly shown in FIGS. 2 and 3. The function of these stops is to aid the linkages, at the top of stroke, in folding the lift platform to a vertical position.

FIG. 4 depicts the lift mechanism as seen from inside the van, with the lift platform at its bottom position, on the ground outside the van. The linkages 12 and 13 are hinged at 23 and 22 to a steel plate 24 which is permanently fastened to the van wall, above the door opening. The plate 24 is extended at the left, toward the front of the van, and supports several pulleys. One pulley, 26 has the function of changing direction of a steel cable, 27, secured to the linkage 12 and to the side of the platform 17. Another pulley, 28, carries another steel cable, 29, similarly connected to the front linkage 13 and the other side of platform 17. Both cables, 27 and 29, pass over a double-sheave pulley, 31, and are secured by a cable clamp 32 to a single cable 33.

A reversible electric gear motor 34 is connected to a reel 36, on which the cable 33 is wound. The motor 34 is reversed by a switch mechanism, 37, FIGS. 4 and 5, having a spring-loaded operating lever 38. In the horizontal, middle position of this lever the motor is not activated. When one end of the lever is pulled upward the motor runs forward and winds the cable 33 on its reel 36. When the other end of the lever is pulled upward the motor runs backward and unwinds the cable. The cords, 39 and 41, are secured to the two ends of lever 38 for easy operation of the switch from either inside or outside the van.

The motor is based on a hinged plate, 42, which is held down by a spring 43 secured to the floor of the van. If extraordinary stress is applied by cable 33, the motor on its hinged base lifts up against the spring; thus the spring serves as a shock absorber at the top of the lifting motion of the mechanism.

FIG. 6 generally illustrates the forward linkage, including the platform 17 resting near the ground 44 outside the van and at almost the furthest down position. The major links of the linkage include a suspension arm 46 pivoted at 47 to the bar 24 on the inside wall of the van above the door opening delimited by the lines 48 and 49. The suspension arm 46 is pivoted to an upper pivot arm 51 and to a lower pivot arm 52 which are of equal length, and which are pivoted at 53 and 54 to a vertical support arm 56. The latter is connected near its bottom end, at 57, by a hinge rod to the similar vertical support arm of the rear linkage. Forward and rear linkages are mirror images of each other.

The platform 17 is hinged on the hinge rod and, in its lowest hinged position relative to the vertical support arm 56, rests on heavy iron angle stops welded to the bottom ends of the front and rear vertical support arms. One such stop is indicated at 58.

One additional link, 59, termed the guide arm, completes the major linkage. This link 59 is pivoted at one end, 61, to the link 52 and at the other end, 62, to a selected point in the face of the forward door jamb 63. This point of fastening to the van structure is, when the suspension arm 46 is vertical, at a selected distance, *a*, above the pivot 64 and a selected distance horizontally, *b*, from the pivot point 47. The two points 47 and 62 are the only points of attachment of this lift linkage to the van structure.

The links 46, 51, 52, and 56 constitute a pantograph with equal opposed sides, so that links 46 and 56, throughout movements, are always parallel. The distance 64–71 equals the distance 53–54, and the distance 71–53 equals the distance 64–54.

Minor links of the linkage at 66 serve to connect the linkage to a cable for raising and lowering the linkage and platform. This cable, generally indicated by the line 29, runs from a pulley 28 down to a sliding direction changer 67 near pivot 53, then down to the minor linkage 66, to which the cable is securely clamped. From there the same cable continues down to be secured at a point 68 on the side edge of the platform 17.

One function of the minor linkage 66 is, on the up cycle of the lift and, at a selected point in the upward movement, to raise the platform 17 on its hinge rod to a nearly vertical attitude.

The minor linkage consists of three parts, illustrated in FIGS. 7, 8 and 9. In FIG. 7 an extension 72 is shown welded to the edge of the end of link 52, near pivot hole 54. In FIG. 8 a link 73 is shown having two pivot holes, 74 and 76. In FIG. 9 a cable-clamping piece 77 is shown. This piece is provided with three holes. In one a cable guide 78 is secured by a bolt. In another a cable clamp 79 is secured, and a third hole 81 is provided through which the cable 29 is passed.

Figure 10:
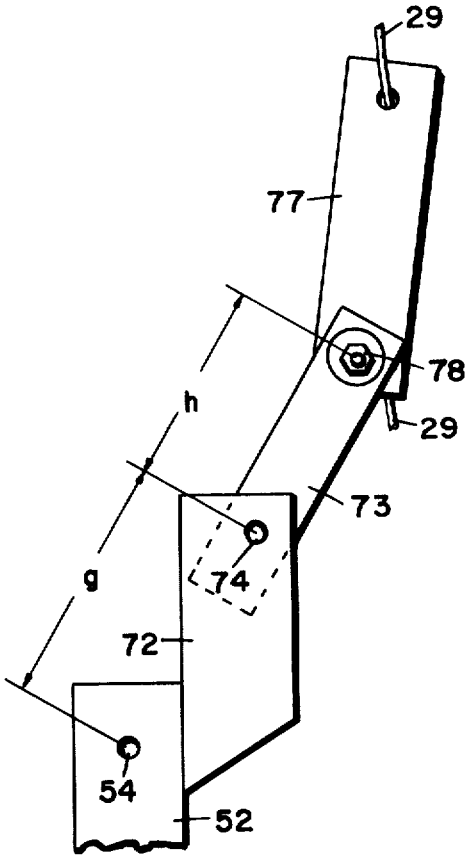
FIG. 10 is an enlarged view, in the first embodiment, of the minor linkage, the lift being in its uppermost position.

When the platform is in its uppermost position the four major links 46, 51, 52 and 56 are folded together and the minor linkage elements are extended. FIG. 10 shows the relative extended positions of major link 52 with its welded extension 72, minor link 73 and cable-clamping piece 77, with the lift at the top position. The other major links are omitted for clarity, as they would be nested with link 52.

Figure 11:
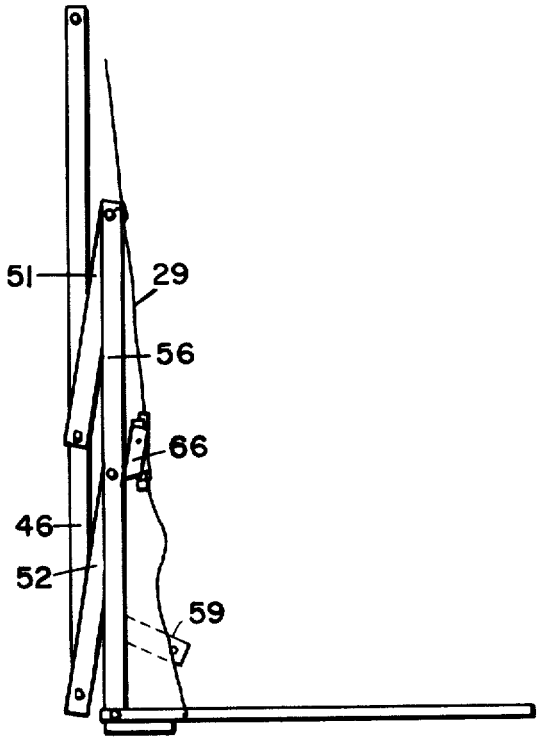
FIG. 11 illustrates, in the first embodiment, the attitude of the linkage at the point in its downward travel at which the minor linkage assumes its folded position.

As the lift is lowered the pantograph link 52 moves out to an angle with the suspension arm 46 and the swing arm 73 rotates slowly clockwise as the platform is lowered. Finally, at a position of the platform a short distance above the floor of the van, the nut 78 strikes the extension 72. The attitude at this point of the major linkage is shown in FIG. 11 and the folded position of the minor linkage, indicated at 66, is enlarged to FIG. 12.

In the operation of the lift, starting with it in its uppermost, stored position and with the van doors open, the motor switch is operated to its reversing position, and the cable 33 unwinds. This cable, attached to the two cables 27 and 29, thereupon allows the minor linkages of the mechanism to fall by gravity. This illustrated in FIGS. 10 and 12, the link 73 rotating on its pivot 74 from the position in FIG. 10 to that shown in FIG. 12, while the major linkage opens from its nested position to that shown in FIG. 11. Meanwhile the platform falls from a vertical position rotating on its hinge rod pivoted at the bottom ends of the two vertical supports, one being illustrated at 56, FIG. 6.

As the platform starts to fall, the hinge edge of the platform, which extends to the rear for a short distance beyond the hinge rod lies against the stops 18 and 19, FIG. 1, presses against these stops and tends to push the platform out and away from its vertical position.

If it is desired to stop the platform at the level of the van floor, the motor operation is stopped when the platform reaches that point. If it is desired to have the platform rest on the ground outside the van, the motor is stopped after the platform has reached the ground.

Figure 12:
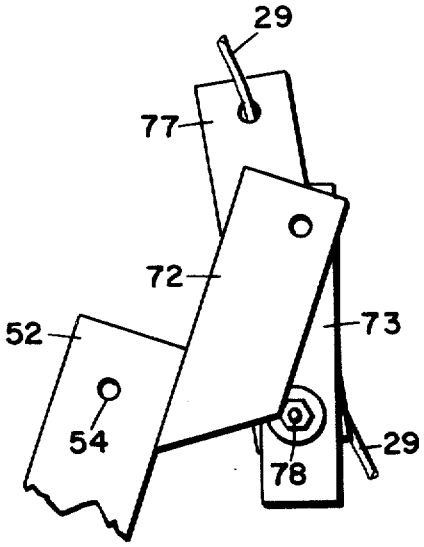
FIG. 12 illustrates, in the first embodiment, the folded attitude of the minor linkage.

In retracting the lift from its bottom position, the motor switch is operated to the forward position and its reel winds up cable 33. Initially, the major linkage is in the position shown in FIG. 6 and the minor linkage as shown in FIG. 12. The cables 27 and 29, as indicated in FIG. 6 for the forward linkage, showing cable 29, now assume stress and lift the mechanism, including front and rear linkages. When the platform reaches the level of the van floor the motor is stopped. The minor linkages are still in the positions illustrated by FIG. 12 and the weight of the platform is carried by the stops 58, FIG. 6.

To store the lift in its uppermost position the motor is again started forward and the two linkages and the platform rise. When the platform has risen an inch or so above the van floor the minor linkages begin to unfold from the position of FIG. 12 to that of FIG. 10, tightening the cables to the platform so that they assume the platform weight and begin rotating the platform on its hinge rod. The rotation of the minor linkages to the position shown in FIG. 10, and the turning of the platform to a vertical position, are completed before or just as the mechanism reaches its top position.

In this action of the platform, the final movement to a vertical position is aided by the stops 18 and 19, FIG. 1. These stops are so positioned that the hinge edge of the platform strikes the stops at their cutout upper ends and thus prevents the lower edge of the platform from moving in further than it should.

In the progress of the lift operation in moving from the "down" position to the uppermost position, when the entire mechanism including the platform is inside the inner wall surface of the van, the pivot point 54, FIG. 6, rises vertically, then near the top moves inward in a curve. To accomplish this, the relative lengths of the several links must be in selected proportions, particularly the lengths of the four links a, d, e, and f. One example of link proportionality which has been determined to produce such action is, referring to FIGS. 6 and 10:

| Link Designation | Proportional Number |
|---|---|
| a | 1 |
| b | 5.65 |
| c | 11.3 |
| d | 10 |
| e | 4.3 |
| f | 2.67 |
| g | 2.33 |
| h | 1.75 |

The second embodiment is shown in FIGS. 13 to 16. It differs from the first embodiment in being operated electro-hydraulically instead of electrically, in eliminating the cables used to hoist the platform in the first embodiment, in eliminating the minor linkage, and in the mechanism used to change the platform attitude between the horizontal and vertical positions. The links 46, 52 and 59 of the first embodiment are retained substantially in their above-described dimensions and in their attachments to the van. The link 51 and the minor links 72, 73 and 77 are omitted. For link 56 there is substituted a new link, 101, extending from the pivot 54 to the platform 17.

Figure 13:
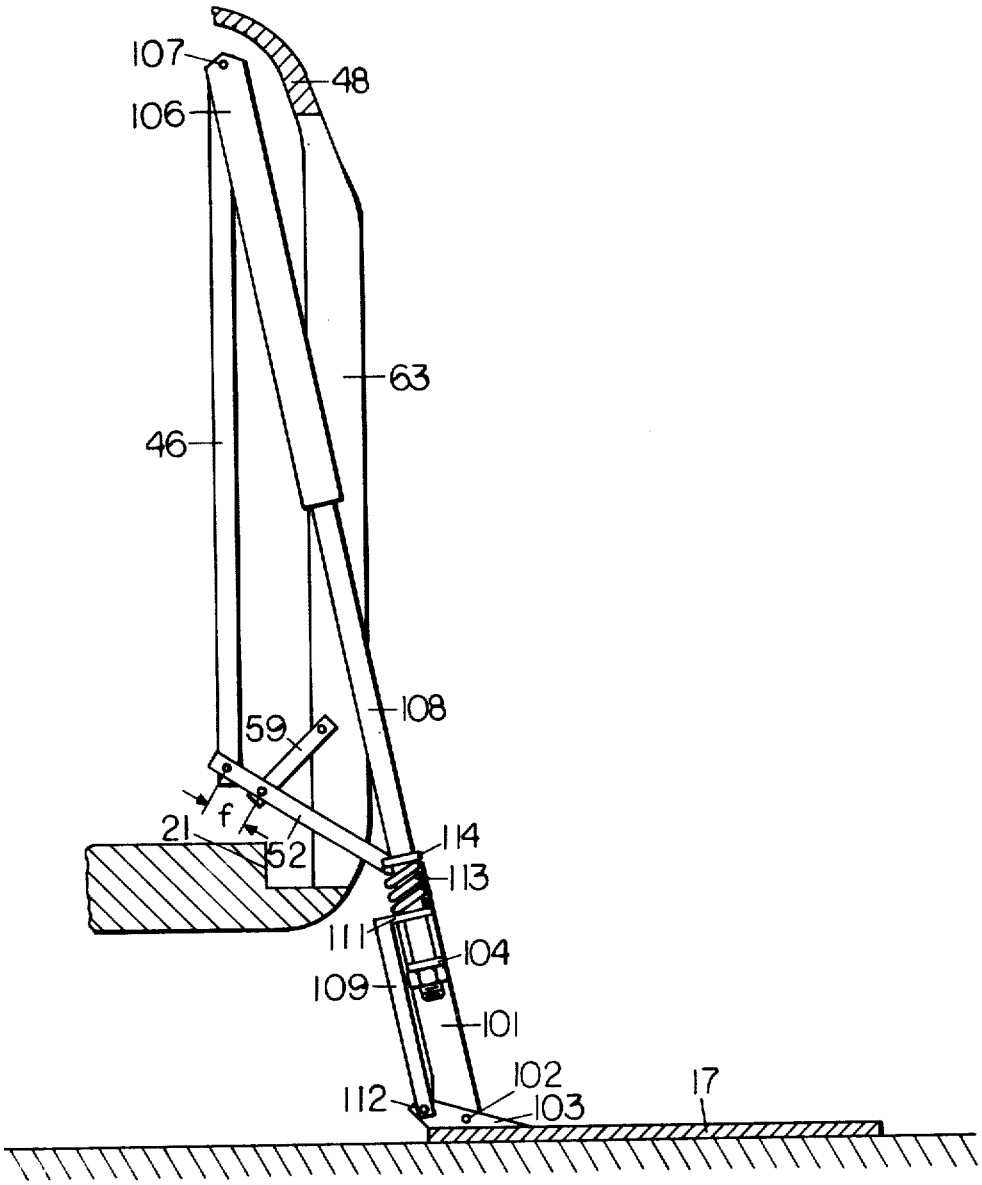
FIG. 13 is a view from within the right side door opening, looking forward, of the second embodiment linkage, sectioned on the line 13 — 13 of FIG. 14, the platform being down.
Figure 14:
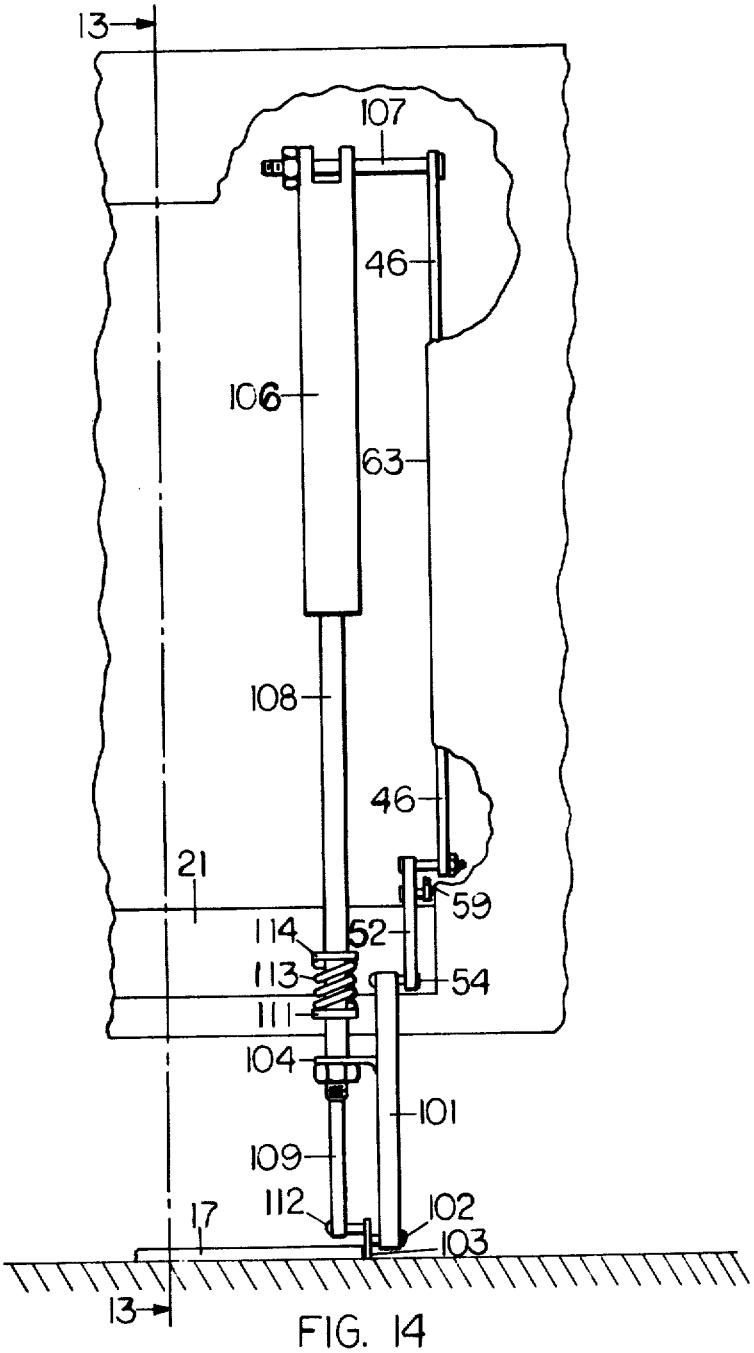
FIG. 14 is a cutaway view from outside the van of the linkage shown in FIG. 13.
Figure 15:
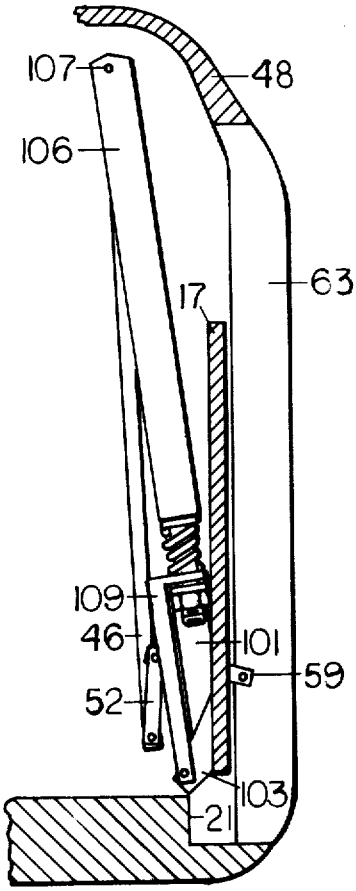
FIG. 15 is a partly sectioned view from within the right side door opening, looking forward, of the linkage shown in FIGS. 13 and 14 but with the linkage folded and the platform up in the stowed position.

Referring to FIGS. 13, 14 and 15, link 101 is a plate pivoted at 54 to link 52 and pivoted at 102 to a small plate 103. The latter is secured to the edge of platform 17. The plate 101 is provided with a welded angle piece 104.

A hydraulic double-acting cylinder 106 is pivoted by a pin 107 to link 46 at the point of attachment 22, FIG. 4, to the van above the door. Alternatively, the cylinder pin 107 may be attached to the link 46 or to the van near, but not precisely at, the pivot location 22.

The piston rod 108 of cylinder 106 is rigidly secured, for example by a shoulder and nut, to the angle piece 104. The latter is thick enough and close fitting enough that side play of rod 108 relative to link, 101 is eliminated. Thus, when the piston rod 108 is pulled into cylinder 106, the link 101 acts as a rigid extension of rod 108 and remains aligned therewith.

A rod 109 is provided with a right-angled extension 111 at one end. This extension 111 has a hole slightly larger than the rod 108, which passes through the hole and is a loose fit therein. The other end of rod 109 is secured to the small plate 103 by a pivot pin 112. A spring 113 surrounds piston rod 108 above the right-angled extension 111, and a loose washer 114 above the spring 113 is a sliding fit on rod 108.

The function of rod 109, spring 113, and the pivot pin at point 112 on small plate 103 is, when the platform and linkage are raised to the uppermost nested position, to move the platform to a vertical position in a manner to be explained later.

Figure 16:
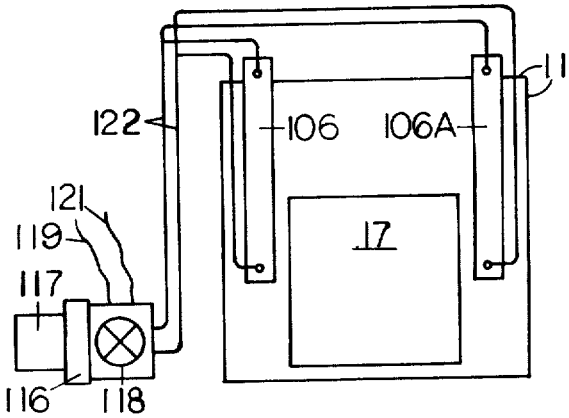
FIG. 16 schematically illustrates the electro-hydraulic power system of the second embodiment for actuating the hydraulic cylinders.

The cylinder 106 is actuated, as indicated in FIG. 16, by a hydraulic pump 116 connected for energization by an electric motor 117. The hydraulic fluid is controlled by an electric solenoid valve assembly 118. This valve assembly 118 is controlled by two spring-loaded cords, 119 and 121. When cord 119 is pulled, it starts the motor 117 and applies high pressure hydraulic fluid to one of the two pipes 122 running to the hydraulic cylinders 106 and 106A. When the other cord is pulled, it starts the motor and applies the high pressure hydraulic fluid to the other of the two pipes 122. Thus one cord causes operation of both hydraulic cylinders in one direction and the other cord causes operation in the other direction. Such hydraulic actuation is well known.

The second embodiment linkage illustrated in FIGS. 13, 14 and 15 is duplicated in mirror image at the other side of the van door opening 11, FIG. 1, and operation of the van lift is generally as described for the first embodiment except in the manner of rotating the platform 17 between its horizontal and vertical attitudes and in the substitution of electro-hydraulic actuation of the lift for electrical actuation.

With the platform 17 in the "down" position, FIGS. 13 and 14, one of the cords, 119, FIG. 16, is pulled. This actuates both cylinders 106 and 106A, pulling both piston rods upward and raising the platform while not substantially affecting its horizontal posture. When the platform is level with the floor, the cord is released and the platform stays as positioned. To raise the platform to its uppermost position, the same cord, 119, is again pulled and the platform rises. When the washer 114 hits the lower end of the hydraulic cylinder 106 it exerts pressure, through the buffer spring 113, on the right-angled extension 111 of the rod 109. This rod in turn presses, through the small plate 103, on that part of the platform 17 extending to the left, in FIG. 13, of the fulcrum pin 102. This depresses the left edge of the platform, raising the main part of the platform toward a vertical position as illustrated in FIG. 15.

On pulling the other cord 121 the two cylinders are actuated in the opposite direction and both piston rods are pushed downward, causing the lift to go down and the platform to assume its horizontal attitude.

It is obvious that, in the linkage, FIGS. 13 – 15, the positions of the hydraulic cylinder 106 and the piston rod 108 could be interchanged, so that the cylinder is secured to the angle piece 104 and the piston rod to the pivot 107, without departing from the general design and method of operation of the lift.

What is claimed is:

1. In an automobile having a van-type body, including body door openings provided with doors, a lift installed therein comprising:

a pair of linkage mechanisms secured to said body at one said door opening, each one of said pair of linkage mechanisms including:

a suspension arm hingingly secured to said body at one end and depending therefrom in a substantially vertical direction;

similar upper and lower pivot arms, each pivoted at one end to the lower end of said suspension arm at points spaced by a selected distance;

a vertical support connected by pivots at two points to the other ends of said pivot arms, said two points being spaced by said selected distance, whereby said upper and lower pivot arms, and a portion of said suspension arm and of said vertical support constitute a pantograph;

a guide arm pivoted at one end in one of said pivot arms and at the other end in the van structure; said lift also comprising:

a platform pivoted to and carried by said linkage mechanism;

means for powering said lift;

a cable connected to said platform and to said means for powering; and a minor linkage connected to one of said pivot arms and to said cable whereby said platform can be raised and lowered and moved between horizontal and vertical positions.

2. A lift in accordance with claim 1 in which said minor linkage comprises:

an extension of one of said pivot arms and adjacent to said vertical support;

a swing arm pivoted at one end in said pivot arm extension;

a cable attachment arm pivoted at one end to the other end of said swing arm; and means securing the other end of said cable attachment arm to said cable.

3. A lift in accordance with claim 2 in which the link proportions in said linkage mechanism are as shown in the following table:

| Link Designations | Proportional Number |
|---|---|
| a | 1 |
| b | 5.65 |
| c | 11.3 |
| d | 10 |
| e | 4.3 |
| f | 2.67 |
| g | 2.33 |

-continued

| Link Designations | Proportional Number |
|---|---|
| h | 1.75 |

4. In an automobile having a van-type body, including at least one body door opening having two jambs and [providing] *provided* with a door, a lift installed in said door opening comprising:

a pair of linkage mechanisms which are identical mirror images of each other, each linkage mechanism being pivotally anchored to said body at two places inside the outer surface of the body, one of said mechanisms being positioned on one side of the door opening and the other on the other side thereof, each said linkage mechanism including:

a first link comprising a bar positioned approximately vertically;

a pivot anchoring the top end of said first link to said van body [above said door opening adjacent one jamb thereof];

a second link comprising a bar;

a pivot connection between one end of said second link and the bottom end of said first link;

a third link comprising a bar;

a pivot connection of one end of said third link to said one jamb;

a pivot connection of the other end of said third link to a point on said second link intermediate the ends thereof, said point being at a distance f from said one end of the second link;

a fourth link comprising a bar, said fourth link connecting the other end of said second link to said platform; said lift also comprising:

a platform secured to and carried by said pair of linkage mechanisms;

means connected to said fourth link for raising and lowering the link and said connected platform;

means for powering said lift; and means connected to said means for powering for raising and lowering said platform and for moving it between horizontal and vertical positions.

5. A lift in accordance with claim 4 in which:

said means for powering is electro-hydraulic;

said means connected to said fourth link for raising and lowering comprises a hydraulic cylinder and piston rod, said piston rod being rigidly connected to said fourth link; and said means connected to said means for powering for controlling the attitude of the platform comprises a first rod having its lower end connected to the rear of the platform and its upper end ending in a right-angled piece surrounding said piston rod, whereby raising of the piston rod produces downward thrust on the first rod in turn changing the platform to a vertical attitude.

* * * * *